Figures 1, 2, 3, 4:
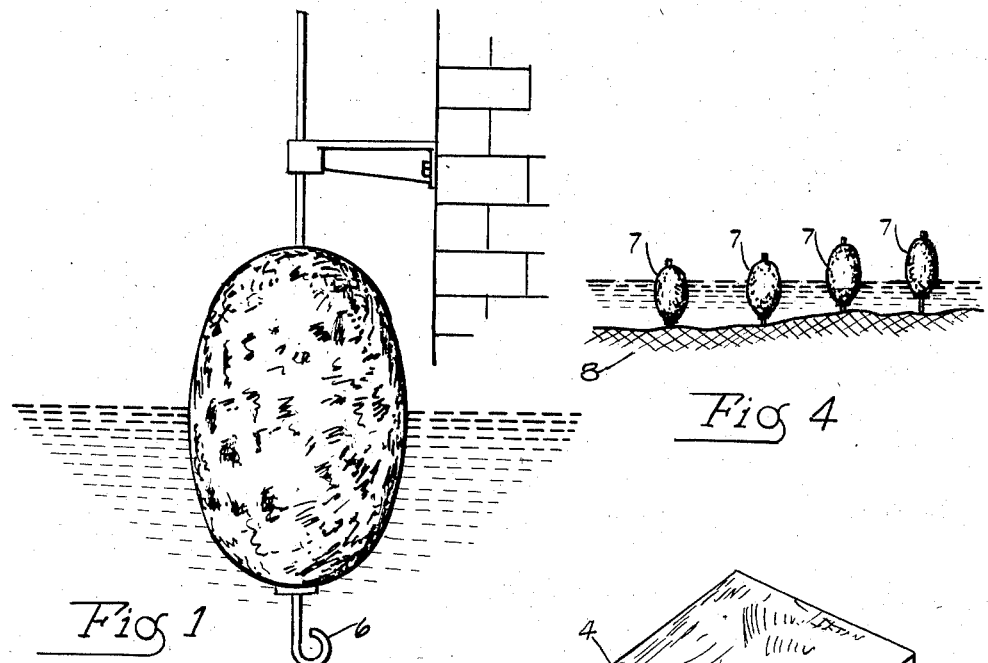

July 8, 1958 J. CASE 2,841,804
FLOAT
Filed March 20, 1953

INVENTOR.
Joseph Case
BY

2,841,804

FLOAT

Joseph Case, Miami, Fla.

Application March 20, 1953, Serial No. 343,667

1 Claim. (Cl. 9—8)

This invention relates to a type of float suitable for use where a dependable and enduring type of float is needed for use in water, either salt water or fresh water.

Different types of float material such as cork, balsa wood, etc. have been used from time immemorial but have always caused eventual difficulty by deterioration due to age or due to becoming water logged. The use of a cellular type glass material has been considered in the past but cellular glass suffers in that it is highly frangible and deteriorates rapidly under even mild repeated shock, for example wave motion. The very thin walls of the glass cells make it especially frangible.

Various attempts have been made to cover the material with different substances such as canvas, plastics, etc. but it has been found that they are too brittle to stand up under long continued usage, particularly under adverse conditions.

The principal object of my invention is to produce a float of cellular glass material which will be usable for long periods of time without deterioration.

The further object of the present invention is to produce a cellular glass float which will be usable for long periods of time and will not deteriorate in salt water or under shock.

The object of my invention is to produce a float of cellular glass which will be inexpensively made and still of enduring quality and substantially fireproof.

A better understanding of my invention can be obtained from reference to the accompanying drawing which shows a preferred embodiment of my invention.

Fig. 1 is a perspective view showing one form of my invention. Fig. 2 is a perspective view partially cut away of another form of my invention. Fig. 3 is a perspective view of a float according to my invention. Fig. 4 is a perspective view showing one possible use of one form of my invention.

The body 1 of the float shown in Fig. 2 is made of cellular glass of any standard type having a weight of approximately 9 lbs. per cu. ft. The body 1 is covered with a layer of porous material 2 such as porous cloth or cheese cloth and this in turn is covered with a particular type of pitch 3. Asbestos 4 forms the outermost layer. The appearance of the completed float is shown in Fig. 3. When the outer layers have been applied the net weight is about 10 lbs. per cu. ft.

In Fig. 1 a similar float is shown in oval shape having a hook 6 at its bottom.

In Fig. 4 a group of floats 7 of the type shown in Figure 1 is shown as attached to a net 8.

In making my novel float I place a layer of porous cloth 2 over the cellular foam glass body 1 of any desired shape and then dip the same into hot melted pitch and allow the pitch to harden and dry. While the pitch is still molten it may be covered with a layer of asbestos fibre by blowing or throwing the fibre on the pitch while it is still molten. The object of the asbestos is to make it substantially fireproof and to help in preventing erosion.

It is important that the pitch be of a plastic semi-soft shockproof type since the ordinary asphalt or similar materials are usually too brittle and readily chipped off. If the outer covering is chipped off it will expose the cellular foam glass to the corrosive action of the water, which will rapidly disintegrate it.

The porous material such as cheese cloth reinforces the pitch and also makes it adhere better.

In addition to using my material as a float for nets, life savers, and similar purposes, the material could be properly placed in the hull of a ship or boat so as to make the hull practically unsinkable. Blocks of material such as shown in Fig. 3 could be used for this purpose. Due to its tremendous buoyancy, having a net weight of about 10 lbs. per cu. ft. compared to 62½ lbs. per cu. ft. for water, it will hold up an enormous amount of weight in the water.

A particularly important use for my product is in hollow channel buoys which are simply hollow iron cylinders. Since these buoys are usually in salt water unattended for great lengths of time, if they spring a leak they will sink and cause considerable difficulty, but if the buoys were filled with my material they will not sink even though the iron itself may spring a leak. The same is true of pontoons supporting floating bridges and the like, in which case even if they are pierced by gun fire they will not sink and retain nearly all of their buoyancy.

The use of the porous cloth material and the elastic pitch serve to protect the cellular foam glass. The asbestos serves to make it nearly fireproof which is important for purpose of safety on shipboard. The asbestos also serves to prevent stickiness of the pitch.

One typical type of cellular foam glass is that produced by the Pittsburgh Corning Glass Co. which has a compressive strength of 125 lbs. per sq. in. and a density of 9 lbs. per cu. ft. conforming to Federal Specification HH–I–551a dated January 16, 1952.

I have found that one of the best materials to use is the pure pitch derived from coal tar with about 2% paraffin added to make it a little more malleable and resistant to water.

Having thus described my invention it is to be limited only by the following claim.

I claim:

In a float, a body having a cellular foam glass core, a porous fabric covering the surface of said foam glass core, a coal-tar pitch material coating said porous fabric, a layer of asbestos fiber covering said pitch material, said pitch material containing approximately 2% paraffin solids for rendering said pitch material malleable, thereby reducing chipping and increasing the waterproofing characteristics of said body, said pitch material penetrating the pores of said fabric and into the surface cells of said core, said porous fabric preventing the formation of air bubbles in said pitch material, said pitch material, asbestos fiber and porous fabric adhering to said core by interlocking with said surface cells to form a non-erosive skin.

References Cited in the file of this patent

UNITED STATES PATENTS

| | | |
|---|---|---|
| 832,999 | Petrie et al. | Oct. 9, 1906 |
| 960,129 | Wilkinson et al. | May 31, 1910 |
| 1,822,636 | Winkelmann | Sept. 8, 1931 |
| 2,553,798 | Van Deventer | May 22, 1951 |